March 11, 1941.  C. W. HEWLETT  2,234,696
PHOTOELECTRIC CELL
Filed May 29, 1937
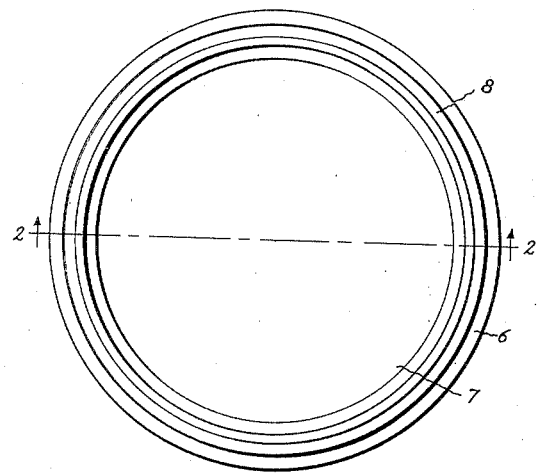
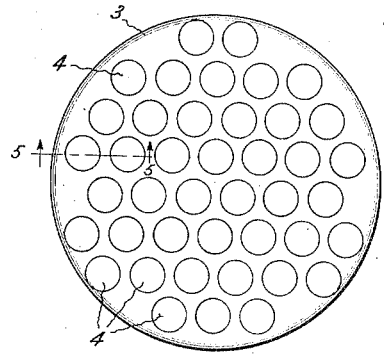
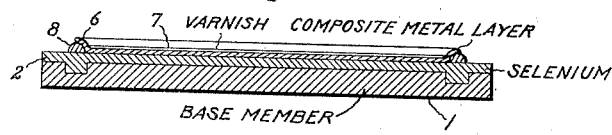
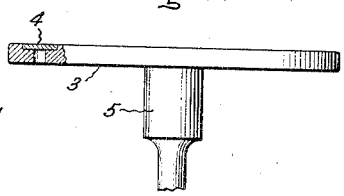
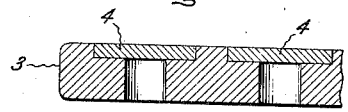
Inventor:
Clarence W. Hewlett,
by Harry E. Dunham
His Attorney.

Patented Mar. 11, 1941

2,234,696

UNITED STATES PATENT OFFICE 2,234,696

PHOTOELECTRIC CELL

Clarence W. Hewlett, Schenectady, N. Y., assignor to General Electric Company, a corporation of New York Application May 29, 1937, Serial No. 145,540

6 Claims. (Cl. 136—89)

The present invention relates to light-sensitive devices, more particularly to photoelectric cells, which generate a measurable electromotive force when subjected to light of practical intensities.

In my application, Serial No. 716,677, filed March 21, 1934, and entitled "Photoelectric cell and manufacturing processes therefor," I have disclosed a light-sensitive device in which a plurality of metal layers are applied to a foundation layer of selenium on a base metal. These metal layers which may comprise cadmium and platinum are laid successively on the selenium as films, semitransparent to light, and preferably by sputtering. For this purpose, cadmium and platinum electrodes are provided in the sputtering chamber, the arrangement being such that the selenium coated base member is first presented to the cadmium electrode and after a film of cadmium has been deposited, the cell is presented to the platinum electrode for the deposition of a platinum layer. Platinum has a lower specific conductivity than cadmium but its effect is to restore conductivity to the combined selenium-cadmium surface and to make good electrical contact therewith. As stated in the said application, when the base metal is made one terminal and the platinum film the other terminal, light impinging on the cell serves to generate current which is sufficiently large to be measured by a microammeter. The meter may be calibrated in foot candles to read directly the light intensities. A photovoltaic cell of this type is satisfactory in operation but its manufacture is somewhat involved in that the cadmium and platinum layers have to be applied separately. This necessitates a plurality of electrodes in the sputtering chamber from which the sputtered material is obtained and besides, some means must be provided to move the selenium coated base member from under one electrode to the other.

The objects of the present invention are to provide a photovoltaic cell of this general type but of an improved character, and more particularly, to simplify the manufacture of these cells so as to simplify the apparatus required for manufacture and thereby cheapen the manufacturing cost. Other objects are to improve the method of applying the metallic coating or coatings to the selenium.

I have discovered, and in accordance with the present invention, that the cadmium and platinum can be laid down simultaneously and still obtain a satisfactory cell. Thus only one sputtering electrode is necessary and this electrode contains all of the metals which it is desired to apply as coating material. After having presented the selenium coated base member to this composite sputtering electrode, there is obviously no necessity for having to move this member in the sputtering chamber, because the entire sputtering step is completely finished in the one operation. The metal layer formed on the selenium in this manner is of composite form and includes all of the metals contained in the active surface of the sputtering electrode. The time required for sputtering the metal coating on the selenium is therefore considerably reduced in that only one sputtering step is required and yet all of the necessary metallic elements are deposited on the selenium.

The invention will be better understood when reference is made to the following specification and the accompanying drawing in which Fig. 1 is a plan view of a cell made in accordance with the present invention; Fig. 2 is a sectional view taken along line 2—2 in Fig. 1; Fig. 3 is a plan view of one typical form of sputtering electrode; Fig. 4 is an elevational view, partly in section, of the sputtering electrode; and Fig. 5 is an enlarged view of a section of the sputtering electrode taken along line 5—5 of Fig. 3.

Referring more particularly to Fig. 2 numeral 1 designates a circular disk constituted of a base metal such as iron or nickel. On one side of the disk, on the upper side as shown, there is a thin layer 2 of selenium. Before the selenium is applied to the disk, the latter is ground to make it smooth and clean, then sandblasted in order to give the selenium a good grip on the surface. Selenium may be evaporated as a layer onto the grooved side of the disk but preferably the selenium is applied as a paste. For this purpose, the disk is placed in a heated fixture (not shown) which has a recess of a depth to accommodate the disk and the desired thickness of the selenium layer. After the selenium paste is applied, a scraper is moved over the fixture, leaving a thin layer of selenium. The disk is then quickly cooled and afterwards is given a hot press treatment in a heated fixture (not shown) which is designed to apply pressure to the selenium layer, pressing it out to the final thickness. The coated disk is then placed in an oven at a temperature of approximately 180° C. to 215° C. and held at this temperature for a time interval determined by experiment and depending upon the quality and kind of selenium employed. This time interval will usually be between a few minutes and several hours. The heat treatment converts the selenium into the metallic light-sensitive form.

Prior to the present invention, it was customary to apply by sputtering and in a successive manner a plurality of metal layers to the selenium. The layer next to the selenium was cadmium and the other layer was of a non-oxidizable metal such as platinum. As stated hereinbefore, while cells made in accordance with this double metal layer method operated satisfactorily, the time consumed in having to deposit the layers in a successive manner and the necessary apparatus required to present the selenium coated disk, first to a sputtering electrode of cadmium and then to a sputtering electrode of platinum, was considerable. I have discovered that it is not necessary that the covering metals shall be laid down in successive layers but on the contrary, may be deposited on the selenium in a simultaneous manner. For this purpose, a sputtering electrode is provided which contains or is constituted of all of the metals which it is desired to sputter onto the selenium so that when this electrode is connected as a cathode of a sputtering circuit and is contained within a chamber containing an inert gas at a suitable pressure, the selenium becomes coated with a homogeneous mixture or alloy of the metals of which the sputtering electrode is composed.

For the sputtering operation, I prefer to employ a large bell jar (not shown) provided with an internally projecting flask or bulb which is adapted to receive liquid air for purposes stated hereinafter. This bell jar or chamber contains argon at a pressure of about 240 microns, and the potential between the sputtering electrode and the anode, which may be the base holding the bell jar, is such as to provide a sputtering current of 50 to 100 milliamperes. While satisfactory results can be obtained by utilizing a sputtering electrode made in various ways and containing in any suitable manner the proper combination of metals, I prefer to employ a cadmium disk which has a large number of inserts of platinum equidistantly spaced about the face of the disk as shown more particularly in Fig. 3. In Figs. 3 and 4, reference character 3 designates the cadmium disk, and the platinum inserts are indicated at 4, all of which are preferably of circular configuration. The openings shown directly underneath the platinum inserts 4 are drilled simply for the purpose of centering a flat-nosed counterbore drill which forms the recesses or cavities in which the inserts 4 are pressed. While satisfactory results may be obtained from different effective areas of cadmium and platinum, I prefer to have the total amount of cadmium, that is, the amount of surface between the counterbored edges, substantially equal to the total area of the platinum inserts. I have obtained particularly good results by employing a circular cadmium disk of 2½-inch diameter containing forty-two 3/32-inch platinum inserts. The upper face of the disk 3 as shown in Fig. 4 is preferably ground smooth and carefully cleaned of all contamination. The disk 3 is provided with a shank 5 by which it is suspended from a vertical support in the sputtering chamber directly over the selenium coated disk 1. A mask (not shown) may be placed about the periphery of the selenium coated disk to shield or protect the edges of the disk from sputtered metal.

During the sputtering process, a flask of liquid air is arranged to penetrate into the sputtering chamber so that any condensable vapors may be removed from the discharge. The sputtering process should preferably be carried out in short flashes so as to avoid heating of the selenium surface as much as possible. The optimum thickness of the composite metal layer 6 (Fig. 2) deposited on top of the selenium is exceedingly small and is so thin as can just barely be seen on the surface and is semitransparent to light. This thickness can best be determined by experiment. It is apparent that both the cadmium and platinum surfaces of the disk 3 will simultaneously supply their respective metals to the selenium, and this coating will comprise a semitransparent and homogeneous mixture of cadmium and platinum. These metals may or may not alloy as they reach the selenium layer. After the selenium coated disk 1 has acquired its metallic coating 6 in the sputtering chamber, it is lacquered, as indicated at 7, to protect the surface from moisture and other atmospheric influences, and laid aside in the air to age, or mature. During this aging process the cell materially improves in its characteristics.

The iron or nickel disk 1 constitutes one of the terminals of the light-sensitive device, and the composite metal layer the other terminal. In order to make adequate contact with this thin metal layer, it may be desirable to provide a heavy ring 8 of cadmium applied near to the outer periphery of the disk in any suitable manner, for example, by a Schoop gun. This ring preferably does not extend to the outermost periphery of the disk, for in this case, the metal might flow over the edge of the disk and short-circuit the metal coating and selenium layer. The inner and outer boundary of this ring can be determined by providing a metal shield which protects the central portion and the annular outermost portion of the surface of the cell. This ring may be applied before or after the composite layer is laid down. The provision of a contact ring constitutes one of the features described and claimed in my copending application Serial No. 145,539, filed May 29, 1937, and entitled "Photoelectric cells and methods of manufacture".

A cell of this character is generally mounted in a Bakelite or hard rubber casing which is provided with a window or glass cover adjacent to the central portion of the metal coating. Electrical conductors are secured in any suitable manner to the iron disk and the ring 8, these conductors being connected to a current measuring device such as a microammeter (not shown). This meter may be calibrated in foot candles, and will give a direct reading of the intensity of light impinging on the cell.

While I do not wish to be limited to any theory, it is probable that the source of the electromotive force generated under these conditions lies at the junction between the selenium and the composite metal coating between which there is a hypothetical and so-called "blocking layer." This phenomenon is well known in the art, so that no further explanation appears to be necessary.

As stated hereinbefore, the present invention concerns itself more especially with the sputtering part of the manufacture in that one electrode is provided for forming the composite metal layer on the selenium. Consequently, the improved cell has a single layer of a composite metal whereas the prior cells have two layers of metal which are applied successively to the cell. The cell which is provided with a composite metal member has been found to be fully as sensitive to light in terms of generated current as the cell in which separately deposited metal layers are employed. While I have described and illustrated a sputtering electrode consisting of cadmium and platinum inserts, it is apparent that other arrangements for combining these two metals may be used. For example, the electrode may be made of platinum with cadmium inserts. The cadmium and platinum may be alloyed together in suitable proportions, as determined by experiment, and then secured in any suitable manner, for example, as a layer, to the sputtering electrode. Powders of these metals thoroughly mixed together may be used, pressed to a suitable shape for a cathode and then fired to cause the body to sinter. A mixture of suitable electrolytes of platinum and cadmium may be electrolyzed so as to cause the two metals to deposit on the sputtering electrode in suitable proportions. Platinum and cadmium may be evaporated simultaneously onto a common receiver or electrode, to form on the latter a homogeneous mixture of the two metals, and this electrode may then be used as a cathode for sputtering. In fact, any method of combining the platinum and cadmium on an electrode may be employed which permits the simultaneous deposition of both metals onto the selenium surface.

What I claim as new and desire to secure by Letters Patent of the United States is:

1. A light-sensitive device comprising a base member coated with selenium and a semitransparent metal layer on said selenium consisting of a homogeneous mixture of cadmium and a relatively non-oxidizable metal.

2. A light-sensitive device comprising a base member coated with selenium and a semitransparent metal layer on said selenium consisting of a homogeneous mixture of cadmium and platinum.

3. A blocking layer photoelectric cell comprising a base metal coated with selenium and with a single semitransparent layer of a homogeneous mixture of cadmium and platinum.

4. The method of fabricating a light sensitive device which includes coating a base member with selenium, forming an electrode which contains components of cadmium and a relatively non-oxidizable metal in interspersed juxtaposition, bringing said electrode into close proximity to said base member, and applying an electrical potential between the base member and the electrode under such conditions as to produce sputtering of the latter, thereby to cause simultaneous deposition of the cadmium and non-oxidizable metal on the selenium.

5. The method of fabricating a light sensitive device which includes coating a base member with selenium, forming an electrode which contains components of cadmium and platinum in interspersed juxtaposition, bringing said electrode into close proximity to said base member and applying an electrical potential between the base member and the electrode under such conditions as to produce sputtering of the latter, thereby to cause simultaneous deposition of the cadmium and platinum on the selenium.

6. A photoelectric cell comprising a back electrode, a layer of crystalline selenium on said back electrode, and a single translucent layer including a plurality of metals overlying said crystalline selenium layer, said layer comprising cadmium and a relatively non-oxidizable metal, both of said metals being in contact with the selenium.

CLARENCE W. HEWLETT.